United States Patent [19]
Braeuer et al.

[11] 3,821,224
[45] June 28, 1974

[54] MAGNESIUM OROTATE GLYCINATE AND ITS COMPLEX COMPOUND WITH MAGNESIUM GLYCINATE AND THEIR PREPARATION

[76] Inventors: Hans Braeuer, Asternweg 6, 8011 Vaterstetten near Munich; Hans Brinkhoff, Heerstrasse 24, 8000 Munich 60, both of Germany

[22] Filed: Jan. 25, 1972

[21] Appl. No.: 220,709

Related U.S. Application Data

[63] Continuation of Ser. No. 36,488, May 11, 1970, abandoned.

[30] Foreign Application Priority Data
May 12, 1969 Germany.............................. 1924174

[52] U.S. Cl............ 260/260, 260/256.4 B, 424/251
[51] Int. Cl............................................. C07d 51/30

[56] References Cited
UNITED STATES PATENTS
3,161,565  12/1964  Vigneron...................... 260/256.4 B Primary Examiner—Donald G. Daus
Assistant Examiner—Anne Marie T. Tighe
Attorney, Agent, or Firm—Erich M. H. Radde

[57] ABSTRACT

The water soluble and substantially non-toxic magnesium orotate glycinate and its complex compound with magnesium glycinate are useful agents in the treatment of magnesium deficiency disorders and diseases.

10 Claims, No Drawings

MAGNESIUM OROTATE GLYCINATE AND ITS COMPLEX COMPOUND WITH MAGNESIUM GLYCINATE AND THEIR PREPARATION

CROSS-REFERENCE TO RELATED APPLICATION

The present application is a continuation of copending application Ser. No. 36,488, filed May 11, 1970 now abandoned and entitled MAGNESIUM OROTATE GLYCINATE AND ITS COMPLEX COMPOUND WITH MAGNESIUM GLYCINATE AND PROCESS OF MAKING AND USING SAME.

BACKGROUND OF THE INVENTION

1. Field of The Invention

The present invention relates to a novel and physiologically effective magnesium salt and more particularly to a magnesium orotate glycinate and its complex compound with magnesium glycinate, to a process of making same, and to a method of using same.

2. Description of The Prior Art

It is known that magnesium salts as they have been administered in the therapy of magnesium deficiency diseases, dissociate in the blood. Due thereto many magnesium salts have a toxic effect on renal function and thus are contraindicated in patients with kidney diseases, uremic renal insufficiency, and pronounced hypotonia. Organic magnesium salts such as the gluconate, asparaginate, L-glutaminate, citrate, nicotinate, ascorbate, oleate, and others are, in general, of low solubility in water.

SUMMARY OF THE INVENTION

It is one object of the present invention to provide a novel, substantially water soluble and substantially non-toxic magnesium salt which does not substantially dissociate in the blood, which is well tolerated by the body tissues, and which has proved of value in the therapy of magnesium deficiency disorders and diseases.

Another object of the present invention is to provide a complex compound of such a novel magnesium salt of improved solubility and other valuable properties.

Still another object of the present invention is to provide a simple and effective process of producing said novel magnesium salt.

A further object of the present invention is to provide a simple and effective process of producing the valuable complex compound of said novel magnesium salt.

A further object of the present invention is to provide a highly effective method of treating magnesium deficiency disorders and diseases with said novel magnesium salt.

A further object of the present invention is to provide a highly effective method of treating magnesium deficiency disorders and diseases with a complex compound of said novel magnesium salt.

A further object of the present invention is to provide a valuable pharmaceutical composition containing, as active agent, said novel magnesium salt.

A further object of the present invention is to provide a valuable pharmaceutical composition containing, as active agent, the complex compound of said novel magnesium salt.

Other objects of the present invention and advantageous features thereof will become apparent as the description proceeds.

The novel and highly valuable magnesium salts according to the present invention are composed according to the following general Formula I

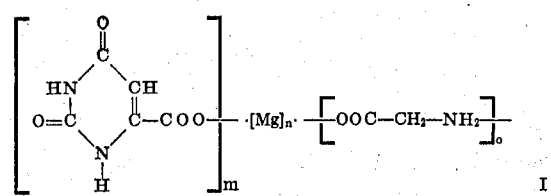

in which
$m$ is 1 or 2,
$n$ is 1 or 3, and
$o$ is 1 or 4
whereby $n$ and $o$ are 3 and 4, when $m$ is 2, while $n$ and $o$ are 1, when $m$ is 1.

The magnesium salt according to the present invention which corresponds to the above given Formula I with $m$, $n$, and $o$ being 1 is the magnesium salt of orotic acid and glycine of the following Formula II

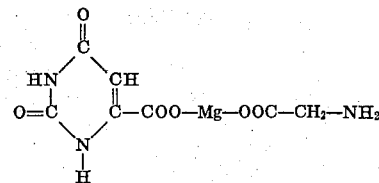

Said magnesium orotate glycinate forms a complex compound with magnesium glycinate. Said complex compound is composed of 2 moles of magnesium orotate glycinate and 1 mole of magnesium glycinate and corresponds to the following Formula III

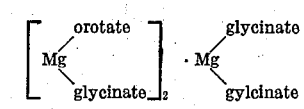

i.e.

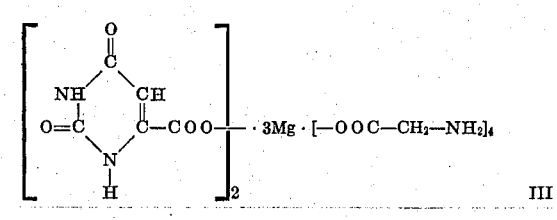

The magnesium orotate glycinate of Formula II has proved to be valuable in the therapy of magnesium deficiency disorders and diseases. It has the important advantage over other magnesium salts that it does not dissociate in the blood and that its orotic acid moiety, by necessity, facilitates introduction and penetration of the magnesium ion into the cells. Magnesium orotate glycinate has the further advantage over therapeutically used inorganic magnesium salts such as magnesium sulfate, thiosulfate, chloride, and others that its anion moiety has also a therapeutic effect. Thus the orotic acid moiety is direactly built into the nucleic acid molecule, i.e. into the protein of the cell nucleus.

Of special importance is also the noteworthy low toxicity of the magnesium orotate glycinate. Even administration of about 2,500 mg./kg. and more to mice and rabbits produced no toxic effects.

The magnesium orotate glycinate of Formula II as well as its complex compound with magnesium glycinate of Formula III are considerably more soluble in water than, for instance, magnesium orotate and other therapeutically useful organic magnesium salts. The following Table shows the solubility of magnesium orotate as such or with the addition of 2 %, 4 % or 8 % of glycine, of magnesium orotate glycinate according to the present invention, and of its complex compound with magnesium glycinate. The molecular weights of said salts and complex compound, their magnesium, orotic acid, and glycine contents, their solubilities in water, the pH-value of their aqueous solutions, the amounts, in mg., of magnesium, orotic acid, and glycine in 1 ml. of their aqueous solutions, and their solubilities and pH-values in stomach juice and in intestinal juice are given in said Table. The gastric and intestinal juices are preparations according to USP 17. One part of the aqueous solution of magnesium orotate or, respectively, magnesium orotate glycinate or magnesium orotate glycinate complex compound in its maximum concentration was added to one part of such gastric and intestinal juices.

It is evident that the solubility of magnesium orotate is very low. Less than about 0.4 % of magnesium orotate are soluble in water. Addition of glycine in amounts of 2 %, 4 %, and even 8 % does not substantially increase its solubility.

In contrast thereto the magnesium orotate glycinate according to the present invention which serves the same therapeutic purpose, has a very considerably higher solubility, namely of about 7 % to 8 %. Its solubility thus is about 20 times as high as that of magnesium orotate.

The complex compound of magnesium orotate glycinate and magnesium glycinate has an even higher solubility, namely of about 9 % to 10 %.

The magnesium orotate glycinate is prepared by simply adding equimolecular amounts of orotic acid and glycine into water which has been heated, for instance, to 80° C., while stirring, and adding equimolecular amounts of magnesium metal in portions thereto. Thereafter, the temperature, preferably of 80° C. is maintained for at least 6 hours in order to complete the reaction. Reaction at room temperature requires a longer reaction time. The resulting solution is then filtered and is adjusted, when preparing parenterally administrable solutions, to the appropriate pH-value, preferably to a pH-value of 7.25 to 7.35, by the addition of an inorganic or organic acid.

The complex compound of magnesium orotate glycinate and magnesium glycinate is produced in an analogous manner by using the required amounts of orotic acid and glycine in the proportion of 1:2 moles and adding thereto the required amount of magnesium metal, i.e. three moles for two moles of orotic acid and four moles of glycine.

| Compound | Molecular weight | Percent Mg | Percent orotic acid | Percent glycine | Solubility in water (percent) | pH | 1 ml. contains in mg: | | | Gastric juice 1:1 | Intestinal juice 1:1 |
|---|---|---|---|---|---|---|---|---|---|---|---|
| | | | | | | | Mg | Orotic acid | Glycine | | |
| Mg(orotate)(orotate) | 334.5 | 7.26 | 92.74 | | 0.37 | 5.6 | 0.27 | 3.43 | | pH: 1.7 crystall. precipitate | pH: 7.5 after 24 hours turbid |
| Mg(orotate)(orotate) + 2% glycine | 334.5 | 7.26 | 92.74 | | .398 | 5.8 | .289 | 3.69 | 20 | | |
| Mg(orotate)(orotate) + 4% glycine | 334.5 | 7.26 | 92.74 | | .451 | 5.8 | .327 | 4.18 | 40 | | |
| Mg(orotate)(orotate) + 8% glycine | 334.5 | 7.26 | 92.74 | | .579 | 5.8 | .42 | 5.37 | 80 | | |
| Mg(orotate)(glycinate) | 253.4 | 9.6 | 61.2 | 29.2 | 7.64 | 6.8–6.9 | 7.33 | 47.0 | 22.07 | pH: 3.7 clear solution | pH: 6.9 clear solution |
| [Mg(orotate)(glycinate)]₂ | 679.1 | 10.73 | 45.67 | 43.6 | 7.98 | *7.1–7.2 | 8.55 | 37.0 | 34.25 | pH: 4.2 clear solution | pH: 6.9 clear solution |
| Mg(glycinate)(glycinate) | | | | | 10.261 | 9.6 | 11.02 | 46.8 | 44.79 | pH: 9.6 clear solution | pH: 9.7 immediate precipitate |
| Mg(glycinate)(glycinate) | | | | | 9.088 | *7.8 | 9.76 | 41.5 | 39.62 | pH: 4.5 clear solution | pH: 7.3 turbid after 24 hours |

* = neutralized to the given pH value by means of hydrochloric acid.

The solid salts are obtained from the reaction solutions by precipitation in organic solvents, by concentration in vacuo, or by spray drying.

DESCRIPTION OF THE PREFERRED EMBODIMENTS

The following examples serve to illustrate the present invention without, however, limiting the same thereto.

EXAMPLE 1

312 g. of orotic acid and 150 g. of glycine are added to 2000 ml. of water at 80° C. while stirring. 48 g. of magnesium chips are added at 80° C. to the resulting solution in portions of about 5 g. of magnesium while stirring. Stirring at said temperature is continued for about 6 hours whereafter the reaction mixture is filtered. The resulting solution is cooled to room temperature and yields about 350 g. of magnesium orotate glycinate.

EXAMPLE 2

356 g. of orotic acid in its hydrate form and 300 g. of glycine are added to 4000 ml. of water at 80° C. while stirring. 72 g. of magnesium chips are added thereto in small portions of 5 g. Gas is generated during said addition. Stirring of the reaction mixture at said temperature of 80° C. is continued for 6 hours whereafter it is filtered. On cooling and evaporation to dryness, about 675 g. of the complex compound are obtained.

PHARMACEUTICAL COMPOSITIONS

The novel magnesium orotate glycinate and its complex compound with magnesium glycinate according to the present invention are administered in therapy in the form of orally administrable solid shaped preparations such as tablets, dragees which may be enterically coated, pellets, pills, lozenges, or in powder or granule form, preferably enclosed in gelatin and the like capsules. Administration in liquid form, such as in the form of solutions, sirups, emulsions, suspensions, dispersions, fruit juices, and the like is also possible.

Such powders, granules, and mixtures to be used in the preparations of tablets and other shaped and/or compressed preparation may be diluted by mixing and milling with a solid pulverulent extending agent to the desired degree of fineness or by impregnating the already milled, finely powdered, solid carrier with a suspension of said compounds in water or with a solution thereof in an organic solvent such as ethanol, methanol, acetone, and others and then removing the water or solvent.

When preparing tablets, pills, dragees, and the like shaped and/or compressed preparations, the commonly used diluting, binding, and disintegrating agents, lubricants, and other tableting adjuvants are employed, provided they are compatible with said magnesium orotate glycinate compounds. Such diluting agents and other excipients are, for instance, sugar, lactose, levulose, starch, bolus alba; as disintegrating and binding agents, gelatin, gum arabic, yeast extract, agar, tragacanth, methyl cellulose pectin; and as lubricants stearic acid, talc, magnesium stearate, and others.

The magnesium orotate glycinate and its complex compound with magnesium glycinate according to the present invention may also be administered parenterally, for instance, in the form of solutions in isotonic aqueous solutions.

Administration in the form of suppositories is, of course, also possible.

Such pharmaceutical compositions are prepared according to pharmaceutical compounding methods as they are conventionally used in the art.

The following examples of pharmaceutical compositions containing magnesium orotate glycinate or its complex compound with magnesium glycinate serve to illustrate the preparation thereof without, however, being limited thereto.

EXAMPLE 3

100 g. of magnesium orotate glycinate and 400 g. of starch are intimately mixed and portions of 250 mg. thereof are filled into gelatin capsules. Each capsule thus contains 50 mg. of magnesium orotate glycinate.

EXAMPLE 4

100 g. of the complex compound of magnesium orotate glycinate and magnesium glycinate, 1090 g. of starch, and 10 g. of magnesium stearate are intimately mixed with each other and are compressed to tablets, each tablet weighing 300 mg. and containing 25 mg. of the complex compound.

EXAMPLE 5

The mixture of Example 4 is compressed to biconcave dragee cores, each weighing 250 mg. and containing 20 mg. of the complex compound. The cores are then provided with an enteric shellac coating in a manner known in the compounding art.

Of course, other dosage forms than capsules and tablets can be prepared by using well known compounding techniques.

EXAMPLE 6

700 g. of magnesium orotate glycinate are dissolved in 10 l. of distilled water to yield a solution containing 7 % of the active compound. The pH-value of said solution is about 6.9. The solution is filled in ampoules of 5 cc. each and is sterilized. It is administered by intravenous, intramuscular, or subcutaneous injection. 1 cc. of the solution contains 70 mg. of magnesium orotate glycinate corresponding to about 6.7 mg. of magnesium, about 43.2 mg. of orotic acid, and 20.8 mg. of glycine.

EXAMPLE 7

1500 g. of the complex compound of magnesium orotate glycinate and magnesium glycinate are dissolved in 20 l. of distilled water. The pH-value of the resultant solution containing 7.5 % of the active compound is adjusted by the addition of hydrochloric acid to a pH of 7.1. The solution is then filled in ampules of 10 cc. each. 1 cc. thereof contains 75 mg. of the complex compound corresponding to about 8.02 mg. of magnesium, about 34.8 mg. of orotic acid, and about 32.2 mg. of glycine.

The parenterally administrable solutions according to Examples 6 and 7 have proved to be especially useful in the parenteral therapy of cardiac and circulatory diseases and disorders.

PHARMACOLOGICAL TESTS

Intravenous, intramuscular, and subcutaneous injections of 5 cc. ampoule solutions of magnesium orotate glycinate containing 22 mg. of magnesium in rabbits, guinea pigs, and rats did not produce any local or systemic reaction four or five days after administration. Since these test animals are very sensitive to drugs when administered parenterally, they prove that magnesium orotate glycinate is well tolerated by the body tissues.

CLINICAL DATA

Magnesium orotate glycinate and its complex compound with magnesium glycinate have a pronounced effect on the total lipid content in the blood especially of elderly persons. The compounds were given in the form of gelatin capsules which have been hardened by treatment with formaldehyde in order to render them resistant to gastric juice but are readily dissolved by the intestinal juice. The disintegration time of the capsules was determined according to U.S. Pharmacopeia, Revision XVIII. The tests showed that the total lipid content in the blood was reduced, on administration of 200 mg. to 400 mg. of magnesium orotate glycinate daily for three months, as an average by about 22 %.

Magnesium orotate glycinate and its complex compound with magnesium glycinate are therapeutically used in the treatment of magnesium deficiencies, protein deficiencies to supplement biologically insufficient proteinaceous food, intestinal disorders especially if the intestinal flora is unfavorably affected, and thus vitamin $B_6$ and $B_{12}$ deficiencies, degenerative cardiac and circulatory disorders, atherosclerosis, tetanic spasms, and the like. The compounds are also administered for their blood pressure lowering effect, for the prevention and treatment of thrombotic processes, for their detoxifying function in the treatment of alcoholism and disorders of the liver. They also have a noteworthy effect on accelerating reconvalescence and recuperation from operations and increasing the power of resistance against infectious diseases.

The dosage administered may vary depending upon the seriousness of the diseases. Amounts up to 15 mg.% of magnesium, calculated for the amount of blood plasma, can be injected in the form of magnesium orotate glycinate. Depending upon the dose administered, the physiological effects achieved may range from mild sedation through complete relaxation to pronounced narcosis free of reflexes. The sceletal musculature can be brought to a state of complete relaxation. Spasmolytic effects are already observed on administering 10 mg.% of magnesium, calculated for the blood plasma, in the form of magnesium orotate glycinate. Thus the doses administered may vary from about 30 mg. to about 3 g. of magnesium orotate glycinate or of the complex compound given once to five times daily by injection. The solution of magnesium orotate glycinate or of the complex compound can also be administered by continuous intravenous infusion, for instance, after cardial infarctions or myopathias cordes. The peroral doses are about half as high up to three times as high as the intravenous doses, i.e. between about 15 mg. and about 9 mg. of magnesium orotate glycinate or of the complex compound given once to three times daily.

We claim:

1. A magnesium orotate glycinate compound of the formula

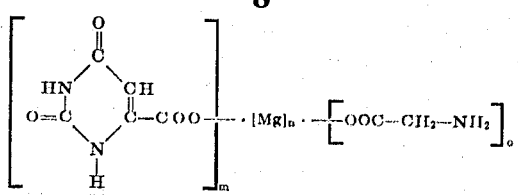

in which
   $m$ is one of the integers 1 and 2,
   $n$ is one of the integers 1 and 3, and
   $o$ is one of the integers 1 and 4,
whereby $n$ is 3 and $o$ is 4, when $m$ is 2, while $n$ and $o$ are 1, when $m$ is 1.

2. The magnesium orotate glycinate compound of claim 1, in which $m$, $n$, and $o$ are 1, said compound being magnesium orotate glycinate of the formula

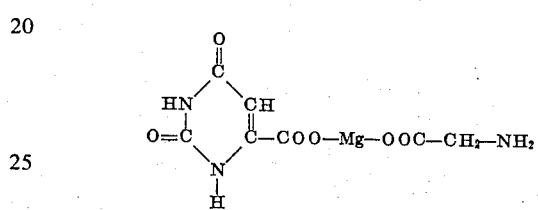

3. The magnesium orotate glycinate compound of claim 1, in which $m$ is 2, $n$ is 3, and $o$ is 4, said compound being the complex compound of magnesium orotate glycinate with magnesium glycinate of the formula

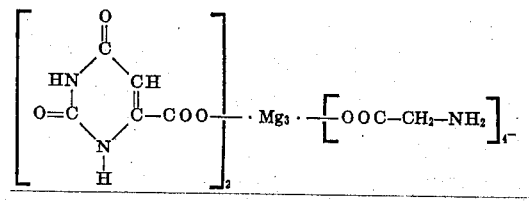

4. In a process of producing a magnesium orotate glycinate compound of the formula

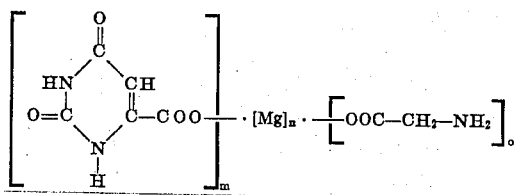

in which
   $m$ is one of the intergers 1 and 2,
   $n$ is one of the integers 1 and 3, and
   $o$ is one of the integers 1 and 4,
whereby $n$ is 3 and $o$ is 4, when $m$ is 2, while $n$ and $o$ are 1, when $m$ is 1, the steps which comprise adding orotic acid and glycine to water, the molecular proportions of orotic acid and glycine being between 1:1 and 1:2, and adding magnesium metal to the resulting aqueous mixture in an amount corresponding to three atoms of magnesium for from two moles to three moles of orotic acid and from four moles to three moles of glycine and recovering the resulting magnesium orotate glycinate from the reaction mixture.

5. The process of claim 4 for producing magnesium orotate glycinate, in which equimolecular amounts of orotic acid and glycine are added to water while stirring, magnesium metal in small portions is added to said aqueous mixture in an amount of 1 atom of magnesium for one mole of orotic acid, and the magnesium orotate glycinate is recovered from the reaction mixture.

6. The process of claim 5, in which orotic acid and glycine are added to water while heating and stirring, the resulting aqueous mixture is heated during the addition of magnesium metal, and heating is continued thereafter until salt formation is completed.

7. The process of claim 6, in which the orotic acid and glycine are added to water at a temperature of about 80° C., magnesium is added thereto at a temperature of about 80° C., and heating of the reaction mixture is continued at said temperature of about 80° C. until salt formation is completed.

8. In a process of producing the complex compound of magnesium orotate glycinate and magnesium glycinate of claim 3, the steps which comprise adding orotic acid and glycine substantially in the proportion of 2 moles of orotic acid and 4 moles of glycine to water while stirring, adding magnesium metal in small portions to said aqueous mixture in an amount of 3 atoms of magnesium for 2 moles of orotic acid and 4 moles of glycine, and recovering the complex compound of magnesium orotate glycinate and magnesium glycinate from the reaction mixture.

9. The process of claim 8, in which the orotic acid and the glycine are added to water while heating and stirring, the resulting aqueous mixture is heated during addition of the magnesium metal, and heating is continued thereafter until complex salt formation is completed.

10. The process of claim 9, in which the orotic acid and glycine are added to water at a temperature of about 80° C., magnesium is added thereto at a temperature of about 80° C., and heating of the reaction mixture is continued at said temperature of about 80° C. until complex salt formation is completed.

* * * * *